March 8, 1949.  M. KOSTRUBANIC, JR  2,463,700

FASTENER

Filed March 10, 1945

INVENTOR
MICHAEL KOSTRUBANIC JR.
BY
ATTORNEY

Patented Mar. 8, 1949

2,463,700

UNITED STATES PATENT OFFICE 2,463,700

FASTENER

Michael Kostrubanic, Jr., Garfield Heights, Ohio, assignor to The Cleveland Pneumatic Tool Company, Cleveland, Ohio, a corporation of Ohio Application March 10, 1945, Serial No. 582,047

5 Claims. (Cl. 85—6)

The present invention relates to a fastener for temporarily holding together superposed plates or sheets in perforate alignment, preparatory to the riveting thereof.

An important object of the invention is to produce a fastener or a temporary rivet which may be readily applied to and removed from the work, the temporary rivet being constructed in a manner forming a simple assembly which is strong, durable and efficient.

Another object of the invention is to provide a fastener capable of securing perforated metal sheets together wherein the parts thereof are united in a manner to preclude separate disengagement thereof should the fastener break while in use or while being applied to the sheets.

A further object of the invention is to provide a temporary fastener comprising a cup-shaped housing adapted to rest on the topmost sheet being fastened, the housing being formed with a central bore in its bottom wall through which extends a retainer formed with a pair of legs maintained in spaced relation by means of a separator, with means surrounding the legs adapted to maintain the separator in position to thereby prevent disengagement of the several parts should the fastener break while in use or while being applied to the sheets.

Other objects and advantages more or less ancillary to the foregoing reside in the specific construction and aggroupment of the elements peculiar to this structure, as will become apparent from a more complete examination of this specification.

Figure 1:
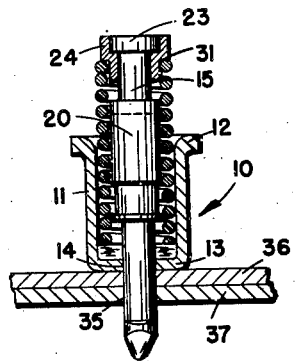
Figure 1 is a vertical sectional view with parts in elevation of the improved fastener.

Referring to the drawings for a more detailed description thereof, the new and improved fastener is generally designated by the reference numeral 10 and comprises a cup-shaped housing 11 formed at its upper end with an external annular flange 12. The housing is formed with a base 13 having a cylindrical bore 14 extending centrally therethrough.

Slidably mounted within the housing 11 there is a retainer 15 which is preferably formed of a single piece of cylindrical material which is slit throughout a portion of its length, as indicated at 16. The retainer being slit, provides a pair of legs 17 which project through the central bore 14 and each leg has its free end provided with a pointed end or foot 18 which forms an outwardly inclined lateral projection 19 for normally engaging the lower face of the base 13, but is adapted to engage the under side of the work, as will be hereinafter explained. The centralmost portion 20 of the retainer 15 is preferably of a greater diameter than the upper and lower portions thereof, and extends from an upper shoulder 21 to a lower shoulder 22. The upper end of the retainer is formed with an annular flange 23 surrounded by a removable C-shaped clamp 24. The diameter of the annular flange 23 is substantially equal to the diameter of the centralmost portion 20 and thereby the diameter of the C-shaped clamp 24 is greater than the diameter of any portion of the retainer 15.

Resting on the inner face of the base 13 and extending downwardly between the legs 17, there is a separator or spreader generally designated by the reference numeral 25. This spreader comprises a head portion 26, tail portion 27 and cross arms 28. The arms 28 normally engage the surface of the base 13 with the head and tail portions disposed between the legs for maintaining said legs out of contact with one another, and for preventing inward lateral movement of the feet 18 when the fastener is in sheet clamping engagement, as will be hereinafter more fully described. The head portion 26 is formed with laterally extending projections or arm portions 29 which arm portions have a spread substantially equal to the diameter of the centralmost portion 20 and operate slidably in the upper end 30 of the slot 16.

Interposed between the shoulder 31 of the C-shaped clamp 24 and the cross arms 28 of the spreader 25, there is a compression spring 32 which surrounds the retainer 15. This spring normally urges the retainer 15 upwardly of the housing 11 and when not in use, the feet 18 will be in engagement with the lower face of the base 13. It is understood that when the fastener is assembled, the spring 32 will be under compression for this purpose.

The fastener in accordance with the present invention has been primarily designed because of its safety features. It has been determined from past experiences that workmen have been seriously injured by parts of the fastener being thrown out of the housing, particularly the retainer stem. This is usually caused by breakage of the feet when the spring is under compression, and the energy in the spring tends to throw the retainer out of the housing with considerable force. The spring resting upon the arms 28 of the spreader minimizes the possibility of the spreader flying out of the housing.

To firmly lock the spreader between the legs of the retainer 15 and thereby obviate the possibility of the retainer flying out of the housing, there is provided a clamping ring 33 which is positioned around the legs 17 in a reduced portion of the centralmost portion 20 between the lower shoulder 22 and an intermediary shoulder 34. The clamping ring 33 is preferably of a material which will snap into place after positioning, being normally locked on the legs thereby but permitting relative movement between the legs of the retainer 15 and the spreader 25. The clamping ring 33 serves, in effect, to close a portion of the slot 16, and should breakage occur on the tail portion 27 or at the feet 18 separation of the parts will be prevented by the action of the extended arm portions 29 making contact upon the upper edge of the clamping ring 33, thereby limiting the expansion of the spring 32 and retaining the assemblage of the several parts.

In the operation of the device, the compression spring 32 active between the collar 24 and the cross arms 28 will normally urge the retainer 15 upwardly relative to the housing 11 causing the lateral projections 19 of the feet 18 to normally engage the base 13. In this instance it will be understood that inward lateral movement of the feet 18 is prevented by the spreader 25 located therebetween.

Figure 2:
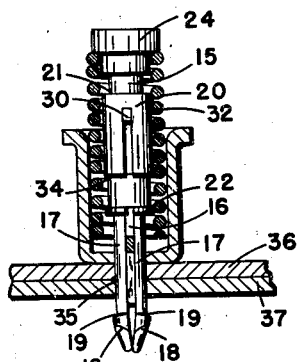
Figure 2 is a vertical sectional view with parts in elevation, the fastener being rotated 90° from that shown in Figure 1.
Figure 5:
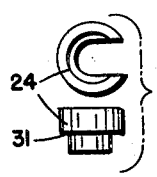
Figure 5 is a top plan and side elevational view of the collar or cap which is mounted on the upper end of the fastener.
Figures 6, 7:
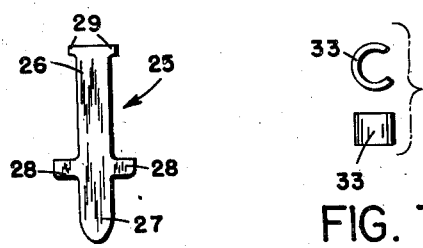
Figure 6 is an elevational view of the separator.
Figure 7 is a top plan and side elevational view of the clamp which surrounds the legs of the fastener for preventing accidental disengagement of the separator.
Figure 3:
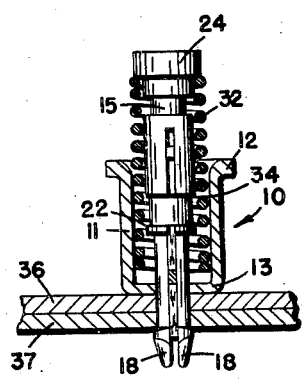
Figure 3 is a vertical sectional view of the fastener in operative position for clamping a pair of sheets.
Figure 4:
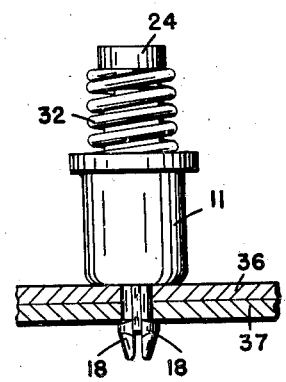
Figure 4 is a side elevational view of the fastener in operative position.

The temporary fastener is applied to or removed from the work by means of a plier-like tool, the construction of which is well known in this art, one jaw of the tool engaging the under side of the annular flange 12 and the other jaw engaging the flange 23 of the retainer 15. Upon movement of the two jaws toward each other, the retainer 15 will be forced downwardly relative to the housing 11 by compressing the spring 32 and causing longitudinal movement of the feet 18 away from the base 13 and out of operative engagement with the depending portion 27 of the spreader 25. It is understood that the legs 17 are formed of a material having a certain degree of resiliency which tends to cause the feet 18 to spring toward each other when out of engagement with the spreader 25. The feet 18 are then free to be inserted through the aligned perforations 35 of the pair of sheets 36 and 37, as shown in Figures 1 and 2 of the drawing. The feet 18 when in the position shown in Figures 1 and 2, are of a diameter smaller than the sheet perforations 35. With the fastener so positioned, the pressure exerted on the annular flange 12 and flange 23 is released, and the retainer 15, due to the action of the compression spring 32, will again be urged upwardly relative to the housing 11, causing the feet 18 of said retainer to be separated or moved laterally away from each other by the spreader tail portion 27. This will cause the lateral projections 19 to engage the under side of the lower sheet 37 for clamping the work between the feet 18 and the base 13. The compression spring 32 is sufficiently strong to hold the sheets 36 and 37 tightly clamped and therefore against relative movement and this position of the fastener is shown in Figures 3 and 4 of the drawing. It is thought to be readily apparent that with the fastener so positioned, and should breakage of the spreader tail portion 27 occur, the possibility of the parts being thrown out of the housing will be precluded by the clamping ring 33. The same is true should breakage of either or both of the feet 18 occur. This breakage only occurs when the fastener is being applied to or removed from the work or when the fastener is in sheet clamping engagement.

When it is desired to remove the fastener from the work, pressure through the plier-like tool may again be exerted on the fastener to compress the spring, as shown in Figures 1 and 2, in which instance the feet 18 will again spring toward each other to enable their withdrawal through the perforations 35. This removal of the retainer, should the retainer not be maintained perfectly coaxial with the perforations 35, is facilitated by the outwardly inclined projections 19 of the feet 18 merely sliding off the lower edge of the perforation of the lowermost sheet.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A device for temporarily clamping together perforated sheets in superposed relation comprising a housing having a sheet engaging base provided with an opening, a retainer including a pair of laterally resilient legs slidable through said opening, feet on one end of said legs adapted to engage the underside of the sheets being clamped, a spreader for said legs, laterally extending projections on said spreader, spring means biased between said retainer and said spreader for drawing said legs inwardly of said housing to urge said feet into sheet clamping engagement, and means surrounded by said spring means and cooperating with said projections to link together said retainer and said spreader to limit the operation of said spring means beyond a predetermined range.

2. A device for temporarily clamping together perforated sheets in superposed relation comprising a housing having a sheet engaging base provided with an opening, a retainer including a pair of laterally resilient legs slidable through said opening, feet on one end of said legs adapted to engage the underside of the sheets being clamped, a spreader for said legs, laterally extending arm portions on said spreader, spring means biased between said retainer and said spreader for drawing said legs inwardly of said housing to urge said feet into sheet clamping engagement, a shoulder on said retainer intermediate the ends thereof, and means cooperating with said arm portions and said shoulder to limit the operation of said spring means beyond a predetermined range.

3. A device for temporarily clamping together perforated sheets in superposed relation comprising a housing having a sheet engaging base provided with an opening, a retainer including a pair of laterally resilient legs slidable through said opening, feet on one end of said legs adapted to engage the underside of the sheets being clamped, a spreader for said legs, laterally extending arm portions on said spreader, spring means biased between said retainer and said spreader for drawing said legs inwardly of said housing to urge said feet into sheet clamping engagement, a shoulder on said retainer encompassed by said spring means, and means between said retainer and said spring means cooperating with said arm portions and said shoulder to limit the operation of said spring means beyond a predetermined range.

4. A device for temporarily clamping together perforated sheets in superposed relation comprising a housing having a sheet engaging base provided with an opening, a retainer including a pair of laterally resilient legs in substantially parallel spaced relation and slidable through said opening, feet on one end of said legs adapted to engage the underside of the sheets being clamped, a spreader for said legs slidable therebetween and including laterally extending projections in said parallel space, spring means biased between said retainer and said spreader for drawing said legs inwardly of said housing to urge said feet into sheet clamping engagement, a shoulder on said retainer intermediate the ends thereof, and means carried by said retainer closing a portion of said space and cooperating with said projections and said shoulder to limit the operation of said spring means beyond a predetermined range.

5. A device for temporarily clamping together perforated sheets in superposed relation comprising a housing having a sheet engaging base provided with an opening, a retainer including a pair of laterally resilient legs in substantially parallel spaced relation and slidable through said opening, feet on one end of said legs adapted to engage the underside of the sheets being clamped, a spreader for said legs slidable therebetween and including laterally extending projections in said parallel space, spring means biased between said retainer and said spreader for drawing said legs inwardly of said housing to urge said feet into sheet clamping engagement, an annular groove in said retainer and means carried by said groove providing an abutment for said projections to limit the operation of said spring means beyond a predetermined range.

MICHAEL KOSTRUBANIC, JR.

REFERENCES CITED

The following references are of record in the file of this patent:

UNITED STATES PATENTS

| Number | Name | Date |
|---|---|---|
| 2,382,508 | Seaver et al. | Aug. 14, 1945 |
| 2,397,892 | Van Sittert | Apr. 2, 1946 |